UNITED STATES PATENT OFFICE.

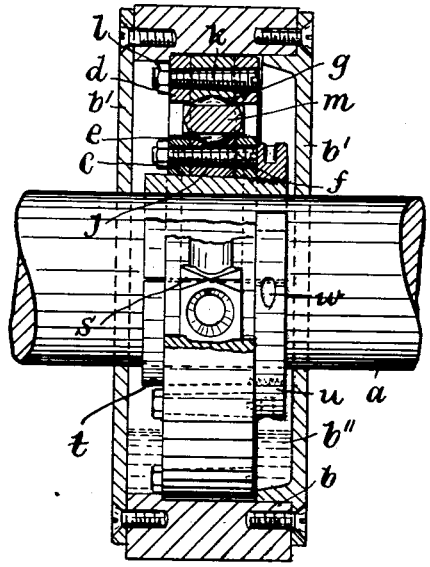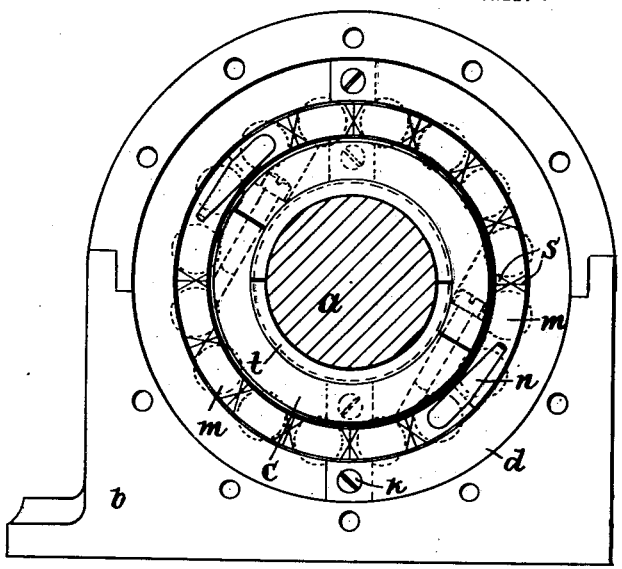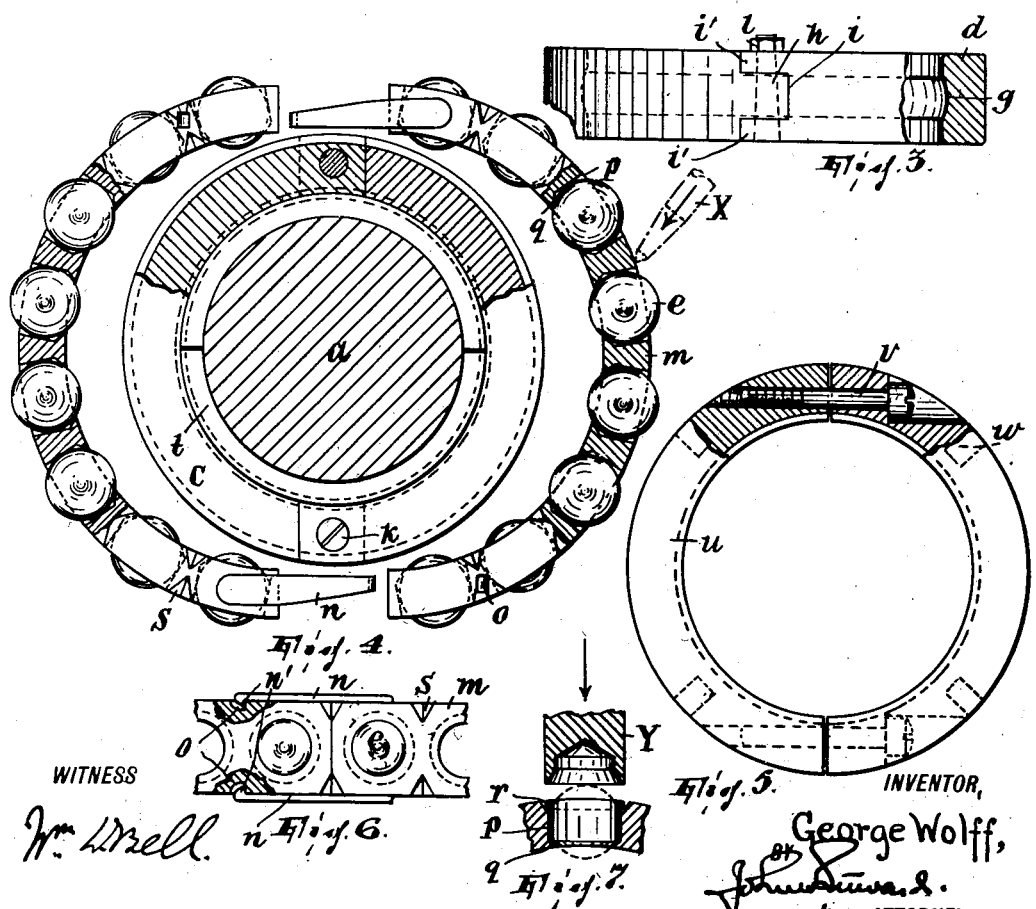

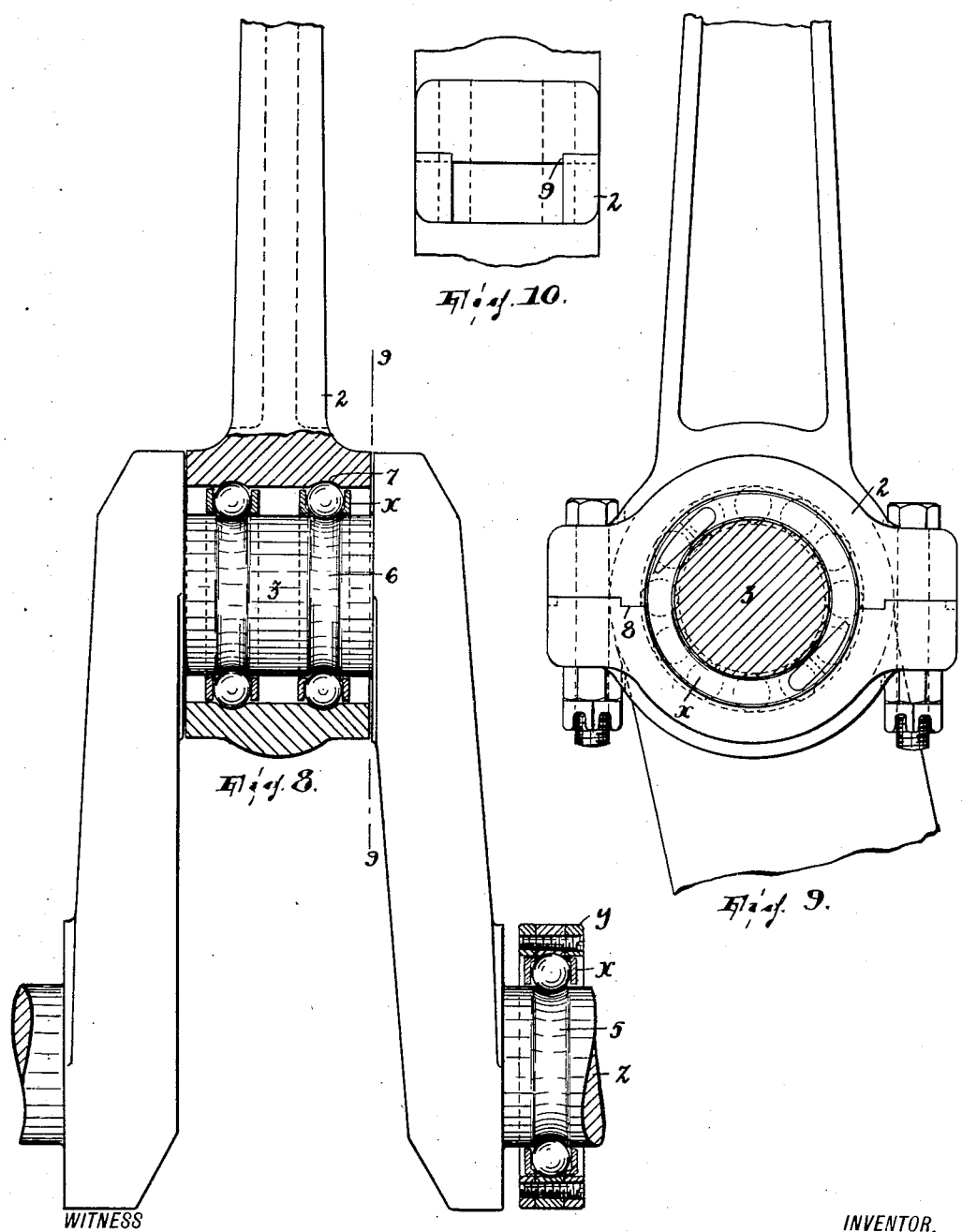

GEORGE WOLFF, OF PATERSON, NEW JERSEY.

ANTIFRICTION-BEARING.

1,340,310.	Specification of Letters Patent.	Patented May 18, 1920.

Application filed April 30, 1919. Serial No. 293,690.

*To all whom it may concern:*

Be it known that I, GEORGE WOLFF, a citizen of the United States, residing at Paterson, in the county of Passaic and State of New Jersey, have invented certain new and useful Improvements in Antifriction-Bearings, of which the following is a specification.

This invention relates to anti-friction bearings, and it includes (first) an anti-friction bearing formed with its annular race-forming elements sectional, to permit their being applied to or removed from the shaft or equivalent to which the bearing appertains without dismounting such shaft, and being of such construction that notwithstanding the sectional character of said elements the sections thereof will be capable of being made to assume and thereupon will be well adapted to preserve the true relation to each other necessary at their joints in order that the races may be continuously smooth; the invention includes (second) a novel sectional device to secure an annular sectional race-forming member in fixed relation to the part which carries said element (as the shaft); and the invention includes (third) a novel cage or retainer to keep each ball or equivalent in definite position in the ball-series, the same being capable of being used either with the sectional race-forming elements above referred to or in other adaptations.

In the drawings,

Figure 1 is a side elevation showing the improved anti-friction bearing, the shaft (in section) supported thereby, and the pillow-block carrying the bearing;

Fig. 2 is a vertical sectional view of what appears in Fig. 1;

Fig. 3 is a plan, partly in section, of one of the race-forming members;

Fig. 4 shows the several parts (excepting the pillow-block and outer race-forming member) the same as they appear in Fig. 1, but partly in section and the ball-retainer or cage in partly withdrawn position;

Fig. 5 shows the securing device for one of the race-forming members, here the inner one;

Fig. 6 is a fragmentary plan of the joint portion of the ball-retainer sections;

Fig. 7 illustrates, in a fragmentary sectional view, how the balls may be retained in the ball-retainer;

Figs. 8 and 9 are a plan and a side elevation, partly in section on line 9—9, Fig. 8, illustrating the ball-retainer in an adaptation different from that of Figs. 1 and 2; and Fig. 10 is a fragmentary elevation appertaining to Fig. 9.

Referring, first, to Figs. 1 to 7:

Let $a$ designate any shaft or equivalent and $b$ the pillow-block in which, for example, through the medium of an anti-friction bearing, the shaft is to be journaled.

Two annular race-forming members are shown, the inner member $c$ and the outer member $d$, these respectively having (in the illustrated case, since balls $e$ form the anti-friction or rolling elements by way of example) an outer peripheral race $f$ and an inner peripheral race $g$. Each race-forming member is sectional, being composed of (here) two semi-circular sections, and as with respect to the joints between the sections both members are alike a description of one will serve for both. Each joint for each member consists of a tongue $h$ (preferably rectangular as seen in plan, Fig. 3) on the end of one section and a recess $i$, exactly conforming in shape to the tongue, in the end of the other section, the recess in effect forming projecting ears $i'$ between which the tongue is received. The tongue and ears having been assembled as shown in Fig. 3 a tapered threaded hole $j$ is tapped into and through all three, and into this is adapted to be introduced the tapered screw $k$, which may be equipped with a locknut $l$.

Generally it will be substantially impossible to position the balls $e$ in the races in assembling the parts without employing some auxiliary contrivance, and to this end, and also to support the balls in properly spaced relation when the bearing is completely assembled I employ the sectional ball-retainer or cage $m$. The semi-circular sections of this device have their joints formed as follows: Their ends are made to form butt-joints, and one section at each joint has on both sides spring clips $n$ and the other corresponding notches $o$ which receive the hooks or lugs $n'$ formed on the ends of the clips; the end of one section is entered between the clips on the other till said ends abut, whereupon the clips spring into the notches and interlock the two sections. The cage $m$ has openings $p$ formed radially and equidistantly therein, each large enough to receive a ball with just enough freedom to allow it to rotate excepting at the inner periphery of the cage, where the diameter of the opening is restricted, as at $q$; after each ball is inserted it may be retained in place either by displacing inwardly the metal of the cage adjacent the opening $p$ and at the other periphery of the cage with a prick-punch $x$ (Fig. 4) so as to form a burr to reduce the effective outer diameter of the opening to less than the diameter of the ball, or, as shown in Fig. 7, the opening may have around it at the outer periphery of the cage a lip $r$, formed by grooving the cage around said opening, and this lip, when the ball is in place, may be crowded inward or inturned by the bevel-edge tool Y. Between the ball openings $p$ the cage is cut away at (preferably) both sides of its inner and outer peripheries, forming recesses $s$, the purpose of which will be later explained.

Usually it will be desirable to secure at least one, as the inner one, of the two race-forming members against rotation with respect to the element (shaft or pillow-block) which it immediately adjoins. To this end $t$ is an annular cone made in two semi-circular sections, and $u$ a sectional nut which may be screwed onto the reduced threaded end of the cone and is itself formed in two semi-circular sections held together by the screws $v$, one crossing each of the two joints in the nut; the nut may have holes $w$ to receive a spanner wrench.

To assemble the improved anti-friction bearing with a shaft, as $a$, without dismounting it from its pillow-block or equivalent $b$, the sections of the inner race-forming member $c$ are first assembled and secured together by their screws $k$ and locknuts $l$ at a point lateral, or outside of the pillow-block; then, the balls being mounted and retained in the retainer ring or cage $m$ in one of the ways described, its sections are secured together by the clips $n$ in such a position that the balls register with the race in member $c$; then race-forming member $d$ has its sections assembled the same as member $c$ and in such position that its race registers with the balls, whereupon the two race-forming members, with the intervening balls and cage, are slipped longitudinally of the shaft into the pillow-block; finally the sections of the cone are assembled and entered into the member $c$ (which is interiorly conical to fit the cone) being made to serve as a wedge to jam said member tight with respect to the shaft, whereupon the sections of nut $u$ are secured together by their screws and the nut screwed onto the cone and against member $c$ to keep the cone up to its work.

My construction obviously makes it possible to assemble the anti-friction bearing with the shaft and pillow-block without disturbing the shaft, and at the same time the character of the joints in the race-forming members $c$ $d$ is such that though these members are in fact sectional the joints present perfectly smooth surfaces at the races, the tapered screws $k$ being adapted to bring and hold the two surfaces of the race both sides of the joint proper precisely in true or flush relation with each other.

The ball-retainer or cage, which is obviously an important element in facilitating the assembling of the bearing, may be employed in other adaptations than that illustrated by Figs. 1 to 7. For example, such a cage $x$ is shown in Fig. 8 in connection with an outer race-forming member $y$ the same as the outer race-forming member $d$ already described, to wit, at one of the points where a crank-shaft $z$ is to be journaled in a pillow-block or equivalent (not shown); and in Figs. 8 and 9 it is shown where neither an outer or inner race-forming member is employed, to wit, where a pitman 2 has a bearing on the wrist-pin 3 of the crank-shaft. Where there is no separate race-forming member the race is shown formed directly in one of the two main parts, as at 5 in the crank-shaft and at 6 and 7 in the wrist-pin and pitman. The bearing portion of the pitman or equivalent is of course split, as shown, in order to make it possible to assemble the pitman with the wrist pin, and to insure the surfaces of the race 7 being flush at the joints therein the two parts of the bearing portion are preferably formed with tongue-and-groove connections 8 and 9 as shown in Figs. 9 and 10.

The object of the recesses $s$ in the cage $m$ or $x$ is to permit the grease or other lubricant to reach the paths of travel of the balls along the races; for instance, a lubricant compartment is formed in the pillow-block $b$ in Fig. 2 by the side plates $b'$ suitably attached to the pillow-block, the grease being indicated at $b''$.

Having thus fully described my invention, what I claim as new and desire to secure by Letters Patent is:

1. In combination, with a shaft member and the supporting member therefor penetrated thereby, means interposed between them including an annular bearing device having a continuous race and a plurality of rolling elements in rolling contact with said race, said bearing device including a pair of segmental sections and means to secure their ends together with the races alined with each other, and means to secure said device to one of said members including a cone jammed between said device and the latter member and formed concentric therewith.

2. In combination, with the shaft member and the supporting member therefor penetrated thereby, means interposed between them including an annular bearing device having a continuous race and a plurality of rolling elements in rolling contact with said race, said bearing device including a pair of segmental sections jointed together, each joint consisting of a tongue on one section and a pair of spaced ears on and forming a recess in the other section receiving and conforming in shape to the tongue, and said bearing device also including a securing device extending through the tongue and ears of each joint, and means to secure said bearing device to one of said members including a cone jammed between said device and the latter member and formed concentric therewith.

3. In an anti-friction bearing, the combination of a circular series of rolling elements and an annular retainer member therefor having radial openings formed therein in which said elements are housed and adapted to rotate, each opening having means to oppose escape of the corresponding rolling element therefrom in either radial direction, and said member including a plurality of segmental sections having spring means to lock the same together.

4. In combination, with a circular series of rolling elements, concentric race-forming means having opposed continuous races receiving said elements, and an annular retainer member for said elements having radial openings in which said elements are housed and adapted to rotate, said member having a peripheral lubricant recess extending from the side thereof inwardly between each two openings.

In testimony whereof I affix my signature.

GEORGE WOLFF.